United States Patent
Dang et al.

(10) Patent No.: US 7,041,779 B1
(45) Date of Patent: May 9, 2006

(54) RIGID-ROD BENZOBISAZOLE POLYMERS INCORPORATING NAPHTHALENE-1,5-DIYL STRUCTURE UNITS

(75) Inventors: Thuy D. Dang, Centerville, OH (US); Narayanan Venkatasubramanian, Beavercreek, OH (US); Jar-Wha Lee, Columbus, OH (US); Soo-Young Park, Daegu (KR); Fred E. Arnold, Centerville, OH (US); Barry L. Farmer, Xenia, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 24 days.

(21) Appl. No.: 10/756,888

(22) Filed: Jan. 12, 2004

Related U.S. Application Data

(60) Provisional application No. 60/453,335, filed on Feb. 28, 2003.

(51) Int. Cl.
  *C08G 73/06* (2006.01)
(52) U.S. Cl. .............. 528/423; 528/422; 528/176; 528/205; 528/211; 528/219; 528/272; 528/274; 528/361
(58) Field of Classification Search ................ 528/176, 528/205, 211, 219, 272, 274, 361, 423, 422
See application file for complete search history.

(56) References Cited

U.S. PATENT DOCUMENTS

| 4,533,724 A | 8/1985 | Wolfe et al. |
| 4,762,908 A | 8/1988 | Tsai et al. |

OTHER PUBLICATIONS

T. D. Dang, N. Venkatasubramanian, A. Talicska, S-Y Park, F. E. Arnold, Synthesis and Characterization of Rigid-Rod Benzobisazole Polymers Incorporating Naphthalene 2,6- and 1,5-Diyl Structural Units, Polymer Preprints 2002, 43(1), 660-661, published Apr. 2002.

S-Y Park, J. Lee, N. Venkatasubramanian, T. D. Dang, F. E. Arnold, B.L. Farmer, Structural Studies on Naphthalene Based Rigid-Rod Benzobisthiazole Polymers, Polymer Preprints 2002, 43(1), 248-249, published Apr. 2002.

*Primary Examiner*—Duc Truong
(74) *Attorney, Agent, or Firm*—AFMCLO/JAZ; Bart S. Hersko

(57) ABSTRACT

A benzobisazole polymer having repeating units of the formula:

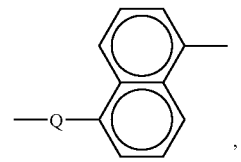

wherein Q is

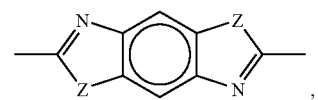

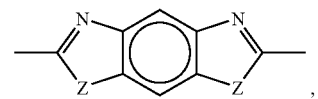

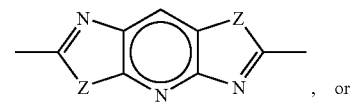

, or

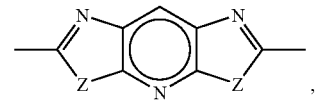

and wherein Z is —O—, —S— or —NH—. A new method for preparing 1,5-naphthalenedicarboxylic acid from 1,5-diaminonaphthalene under relatively mild conditions in good yields is also described.

7 Claims, No Drawings

US 7,041,779 B1

RIGID-ROD BENZOBISAZOLE POLYMERS INCORPORATING NAPHTHALENE-1,5-DIYL STRUCTURE UNITS

CROSS REFERENCE TO RELATED APPLICATION

This application claims priority of the filing date of Provisional Application Ser. No. 60/453,335, filed Feb. 28, 2003.

RIGHTS OF THE GOVERNMENT

The invention described herein may be manufactured and used by or for the Government of the United States for all governmental purposes without the payment of any royalty.

BACKGROUND OF THE INVENTION

The present invention relates to aromatic heterocyclic rigid-rod polymers, and in particular to polymers which contain 1,5-naphthalic segments.

Aromatic heterocyclic rigid-rod polymers, such as PBO and PBT, are well known for their unique mechanical properties and exceptional thermal and thermooxidative stabilities. Uses for such polymers range from conventional reinforcement to protective garments, ballistic vests, and abrasion- and flame-resistant fabrics.

It is an object of the present invention to provide novel aromatic heterocyclic rigid-rod polymers which contain 1,5-naphthalic segments.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided benzobisazole polymers having repeating units of the formula:

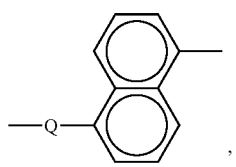

wherein Q is

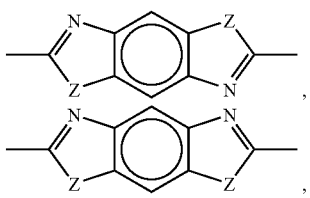

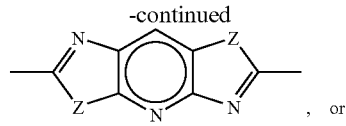

, or

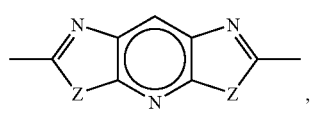

, and wherein Z is —O—, —S— or —NH—.

A new method for preparing 1,5-naphthalenedicarboxylic acid from 1,5-diaminonaphthalene under relatively mild conditions in good yields is also described.

DETAILED DESCRIPTION OF THE INVENTION

The aromatic heterocyclic rigid-rod polymers of this invention are synthesized by the polycondensation of 4,6-diaminoresorcinol dihydrochloride, 2,5-diaminohydroquinone dihydrochloride, 4,6-diamino-1,3-benzenedithiol dihydrochloride, 2,5-diamino-1,4-benzenedithiol dihydrochloride, 1,2,4,5-tetraminobenzene tetrahydrochloride, 2,3,5,6-tetraminopyridine trihydrochloride, 3,5-diamino-2,6-pyridinediol trihydrochloride, 3,6-diamino-2,5-pyridinediol dihydrochloride, 3,5-diamino-2,6-pyridinedithiol trihydrochloride, or 3,6-diamino-2,5-pyridinedithiol dihydrochloride with 1,5-naphthalenedicarboxylic acid in polyphosphoric acid (PPA).

1,5-Naphthalenedicarboxylic acid is prepared by (1) converting 1,5-diaminonaphthalene to 1,5-diiodonaphthalene via the reaction of its bisdiazonium salt with potassium iodide, (2) converting the diiodo compound to the corresponding dinitrile, and (3) hydrolysing the dinitrile.

In conducting the process, the di- or tetra-amino monomer is mixed with polyphosphoric acid. The mixture is heated, under vacuum or an inert gas atmosphere to about 70° to 130° C. over a period of about 3 to 24 hours, to dehydrochlorinate the amino monomer. At the end of this period, the difunctional naphthenic monomer is added. An additional amount of phosphorous pentoxide and/or PPA may be added as required to provide a stirrable mixture with a desired concentration of PPA for polycondensation. An equimolar amount of the naphthenic monomer as compared to the amino monomer is generally used. The amount of PPA used is that which is sufficient to provide a stirrable mixture. In general, the concentration of monomers in the acid usually ranges from about 0.5 to 12.0 percent.

The reaction mixture is heated at a temperature in the range of about 75° to 225° C. for a period ranging from 24 to 96 hours. Preferably, the polymerization is carried out by stages, i.e., a step-wise heating schedule is employed. Step-wise heating is preferred because immediately exposing the reaction mixture to relatively high polymerization temperatures may cause decomposition of the monomers. The selection of a particular step-wise heating schedule is obvious to one of ordinary skill in the art. At the end of the reaction period, the polymer solution is in a very viscous or semi-solid state. After cooling, the product is washed repeatedly with water while stirring, after which it is dried under a high vacuum at an elevated temperature.

The molecular weight of these polymers is commonly indicated by the intrinsic viscosity of the polymer. The intrinsic viscosity is commonly determined at a concentration of 0.2 weight/volume percent in methanesulfonic acid (MSA) at 25° C.

The polymers produced in accordance with the process of the present invention may be used to produce fibers and sheets. In order to form these polymers into fibers or sheets, dopes are prepared containing about 5 to 15 weight percent of the polymer in a strong acid, such as polyphosphoric acid, sulfuric acid, methanesulfonic acid, chlorosulfonic acid, and the like, including mixtures thereof. Such dopes may be spun or extruded into a coagulation bath comprising water or a water/methanesulfonic acid mixture.

The following examples illustrate the invention:

EXAMPLE 1

Preparation of 1,5-diiodonaphthalene 1,5-Diaminonaphthalene (5.4 g, 0.034 mole) was dissolved in a cold solution of 20 ml conc. HCl (25% HCl) and 10 ml distilled water. Diazotization was carried out by adding a cold solution of 4.8 g sodium nitrite in 20 ml distilled water into the diamine salt solution. The solution was stirred for 30 minutes in the temperature range 0–15° C. whereupon an aqueous solution of 16 g of potassium iodide dissolved in 100 ml water was added and the stirring continued for another half hour. The product was extracted with methylene chloride, the organic layer was dried overnight with anhydrous $MgSO_4$ and the crude residue after roto-evaporation of the solvent was recrystallized from heptane affording 8.6 g (63% yield) of yellow crystals of 1,5-diiodonaphthalene, m.pt., 128–130° C.

EXAMPLE 2

Preparation of 1,5-naphthalenedinitrile 1,5-Diiodonaphthalene (8.4 g) was reacted with a mixture of 4.2 g CuCN and 40 ml DMF under reflux conditions overnight. The mixture was cooled and poured into 120 ml aqueous solution containing 12.6 g NaCN. The mixture was stirred for four hours and the filtered product was repeatedly washed with copious amounts of water and dried. The isolated crude product (3.6 g, 92% yield, m.pt., 258–260° C.) was recrystallized from toluene to yield 3.2 g of the product (81% yield, m.pt., 260–262° C.).

EXAMPLE 3

Synthesis of 1,5-naphthalenedicarboxylic acid monomer 1,5-Naphthalene dinitrile (3 g) was mixed with 40 ml of 48% aqueous HBr and 120 ml glacial acetic acid and refluxed overnight. The reaction mixture was cooled, precipitated in a mixture of ice and water. The precipitate was filtered, dried and recrystallized from ethanol. The solution was reduced in volume by evaporating the solvent to yield 2.5 g of 1,5-naphthalene dicarboxylic acid (69% yield, m.pt., 380° C. dec.).

EXAMPLE 4

Benzobisthiazole polymer derived from 2,5-diamino-1,4-benzenedithioldihydrochloride and 1,5-naphthalenedicarboxylic acid Into a resin flask fitted with a high torque mechanical stirrer, a nitrogen inlet/outlet adapter and a side opening for addition, was placed 2.5 g (0.0116 mole) of naphthalene-1, 5-dicarboxylic acid, 2.8352 g (0.0116 moles) of 2,5-di-amino-1,4-benzenedithioldihydrochloride and 20.8 g of freshly prepared 77% polyphosphoric acid (PPA). The monomers were stirred in PPA and the resultant mixture was dehydrochlorinated over a period of 24 hours under a nitrogen flow, slowly raising the temperature to 105° C. to avoid foaming. The mixture was cooled and 11.37 g of $P_2O_5$ was added, to ensure a final polymer concentration of 10 wt % in polyphosphoric acid. The mixture was maintained at 100° C. with stirring to ensure good homogeneity and the temperature was then raised to 165° C. and the polymerization was run overnight. During this process, stir opalescence characteristic of the anisotropic phase of the polymer dope was observed. The polycondensation was continued at 180° C. for a few hours and ~30 g of the polymer dope was taken out for the fiber spinning process. In polarizing optical microscopy, a sample of the dope, sealed between glass slides, was found to exhibit optical birefringence; the persistence of the initially observed optical texture, several days after the sample preparation, was strongly indicative of the lyotropic liquid crystalline behavior of the rigid-rod polymer. The remaining dope was placed in large quantities of water and the fibrous polymer was chopped up in a Waring blender. The polymer was filtered off, soxhlet extracted with hot water and finally dried in vacuum at 100° C. for 24 hours. An intrinsic viscosity of 13.2 dl/g was measured in methanesulfonic acid (MSA) at 30° C. for the dark yellow polymer.

EXAMPLE 5

Benzobisthiazole polymer derived from 2,5-diamino-1,4-benzenedithioldihydrochloride and 1,5-naphthalenedicarboxylic acid Into a resin flask fitted with a high torque mechanical stirrer, a nitrogen inlet/outlet adapter and a side opening for addition, was placed 2.1620 g (0.01 mole) of 1,5-naphtha-lenedicarboxylic acid, 2.4519 g (0.01 mole) of 2,5-diamino-1,4-benzenedithioldihydrochloride and 15.54 g of freshly prepared 77% PPA. The monomers were stirred in PPA and the resultant mixture was dehydrochlorinated over a period of 24 hours under a nitrogen flow, slowly raising the temperature to 105° C. to avoid foaming. The mixture was cooled and 7.29 g of $P_2O_5$ was added, to ensure a final polymer concentration of 12 wt % in polyphosphoric acid. The mixture was maintained at 100° C. with stirring to ensure good homogeneity and the temperature was then raised to 160° C. and the polymerization was run overnight. The polycondensation was continued at 180° C. for a few hours. The viscous polymer dope was taken up in large quantities of distilled water; the fibrous polymer was chopped up in a Waring blender, collected by suction filtration and finally soxhlet extracted with hot water for two days and finally vacuum dried at 100° C. for 24 hours. The yield of the isolated polymer was 3.1 g, 98%. The intrinsic viscosity measured in MSA at 30° C. was 15.5 dl/g.

EXAMPLE 6

Benzobisoxazole polymer derived from 4,6-diamino-1,3-benzenedioldihydrochloride and 1,5-naphthalenedicarboxylic acid Into a polymerization flask fitted with a high, torque mechanical stirrer, a nitrogen inlet/outlet adapter and a side opening for addition, was placed 4.3240 g (0.02 mole) of 1,5-naphthalenedicarboxylic acid, 4.2612 g (0.02 mole) of 4,6-diamino-1,3-benzenediol dihydrochloride and 23.08 g of 77% PPA. The contents of the flask were warmed to 65° C. slowly and then brought up to about 100° C. and maintained at that temperature overnight, while stirring vigorously. After degassing was complete, the reaction mixture was cooled and 11.66 g of 99% $P_2O_5$ was added through the side neck to ensure a final polymer concentration of 14 wt % in PPA. After attaining homogeneity by stirring at 105° C., the reaction temperature was raised to 160° C. for the polymerization to proceed overnight. During this process, stir opalescence characteristic of the anisotropic phase of the polymer dope was observed. The mixture was heated at the final polymerization temperature of 180° C. for four hours and ~35 g of the polymer dope was taken out for the fiber spinning process. In polarizing optical microscopy, a sample of the dope, sealed between glass slides, was found to exhibit optical birefringence; the persistence of the initially observed optical texture, several days after the sample preparation, was strongly indicative of the nematic alignment of the rigid-rod polymer in PPA. The remaining dope was placed in large quantities of water and the fibrous polymer was chopped up in a Waring blender. The polymer was filtered off, soxhlet extracted with hot water and finally dried in vacuum at 100° C. for 24 hours. An intrinsic viscosity of 9.6 dl/g was measured in methanesulfonic acid (MSA) at 30° C. for the fibrous, purple solid.

EXAMPLE 7

Dry Jet-Wet Fiber Spinning of the PPA Dope of Benzobisthiazole Polymer from Example 4

1,5-Naphthalene-containing benzobisthiazole polymer fibers were fabricated by a continuous dry jet-wet spinning method in a custom made device. The polyphosphoric acid dope of the polymer was filtered through a 74 µm stainless steel mesh and deaerated at 100° C. The polymer fiber was then spun at 90° C. with a draw ratio of ~20. Subsequently, the drawn fiber was soaked in large amounts of distilled water for several days to remove residual acid and then air-dried to provide polymer fibers with diameters in the range of 20–50µ.

EXAMPLE 8

Dry Jet-Wet Fiber Spinning of the PPA Dope of Benzobisoxazole Polymer from Example 6

1,5-Naphthalene-containing benzobisoxazole polymer fibers were fabricated by a continuous dry jet-wet spinning method in a custom made device. The polyphosphoric acid dope of the polymer was filtered through a 74 µm stainless steel mesh and deaerated at 100° C. The polymer fiber was then spun at 90° C. with two different draw ratios of 30 and 35. Subsequently, the drawn fiber was soaked in large amounts of distilled water for several days to remove residual acid and then air-dried to provide polymer fibers with diameters in the range of 20–30µ.

Having thus described exemplary embodiments of the present invention, it should be noted by those skilled in the art that the disclosures herein are exemplary only and that alternatives, adaptations and modifications may be made within the scope of the present invention.

We claim:

1. A benzobisazole polymer having repeating units of the formula:

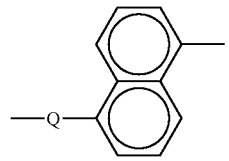

wherein Q is

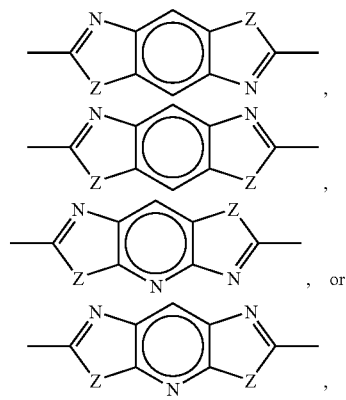

and wherein Z is —O—, —S— or —NH—.

2. The polymer of claim 1 wherein Q is

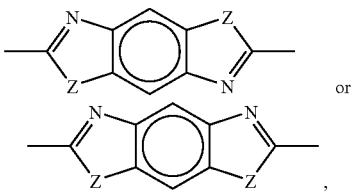

and Z is —O—.

3. The polymer of claim 1 wherein Q is

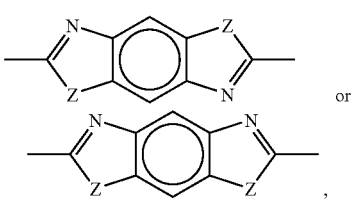

and Z is —S—.

4. The polymer of claim 1 wherein Q is
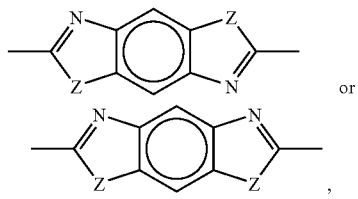
and Z is —NH—.
5. The polymer of claim 1 wherein Q is
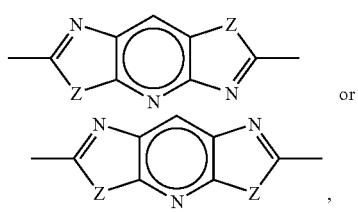
and Z is —O—.
6. The polymer of claim 1 wherein Q is
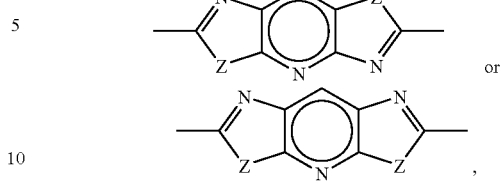
and Z is —S—.
7. The polymer of claim 1 wherein Q is
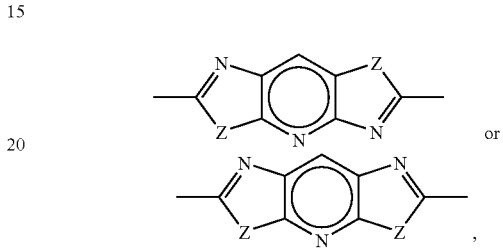
and Z is —NH—.
* * * * *